Patented Nov. 26, 1940

2,222,830

UNITED STATES PATENT OFFICE 2,222,830

STABILIZED REACTIVE SALT MIXTURE

Henry V. Moss, Webster Groves, Mo., assignor to Monsanto Chemical Company, St. Louis, Mo., a corporation of Delaware No Drawing. Application October 14, 1937, Serial No. 168,940

5 Claims. (Cl. 23—243)

This invention relates to mixtures of chemically incompatible materials and more particularly to the stabilization of such mixtures and means of retarding or preventing reaction between two or more chemically reactive constituents of such mixtures.

Illustrative of such mixtures are baking powders, effervescent salts and bleaching or oxidizing preparations, all of which consist of two or more chemically reactive salts or compounds which are designed to react with one another when the mixture is dissolved in water or any other suitable solvent.

A common fault of such mechanical mixtures is slow reaction between two or more of the components which results in premature loss of the effective constituent and consequent reduction in the effectiveness of the compound when it is ultimately used for the purpose for which it was originally designed.

This undesirable premature reaction can and has been partially overcome by the addition of inert fillers like starch or relatively insoluble unreactive inorganic salts like anhydrous calcium sulphate, tricalcium phosphate, and the like, or by reducing the incidence of surface contact between the reactive salts by increasing, or minimizing the range of the particle size of such salts or by precoating the reactive ingredients with a non-hygroscopic water insoluble material like paraffin, oils, waxes and the like or by precoating the reactive materials with an anhydrous sugar which is designed to absorb the adsorbed hygroscopic moisture. It is recognized that whereas the premature reaction is reduced by one or more of the aforementioned means, there are objections to these methods in that addition of inert materials does not alone sufficiently retard the undesirable premature reaction and acts as a diluent to primarily reduce the strength and effectiveness of the mixture. In cases where the particle size of one or more of the reactants in a mixture is increased the solubility and reactivity is reduced so the complete reaction is not effected at the time of actual use in the ordinary time allowed and undesirable, unreacted residues result as, for instance, in baking powder, leaving acid or alkaline salt residues in breads, cakes or baked products, which unreacted salts impart undesirable characteristic flavor or appearance to the baked product. Where the reacting substances are precoated with a water repellent substance, the rate of solution of the mixture is retarded beyond a tolerable degree, which also results in incomplete reaction and as, for instance, in the case of medicinal effervescent salts the insoluble material imparts objectionable turbidity to the solution. The use of a sugar as a precoating agent is impractical where active oxidizing agents constitute part of a mixture, as for instance sodium perborate, calcium hypochlorite etc., because of reaction between the sugar and the oxidizing agent and loss of oxygen, and therefore the effectiveness of the mixture.

The principal object of this invention, therefore, consists in a means of stabilizing mixtures of otherwise incompatible substances and at the same time overcoming the objections inherent in the methods employed heretofore.

A further object is to so alter the surface and/or interfacial tension of water in which the mixture is to be dissolved, so as to accelerate and further facilitate the reaction between the constituents of the mixture when it is dissolved in water.

I have discovered that by precoating the particles of the reactive salts to be used in one or more of the mixtures described above by individually wetting one or more of the constituents of said mixture with a solution of a synthetic non-soapy wetting agent such as a soluble salt of a sulphated alcohol or a sulphonated alkylated aromatic compound, and subsequently drying the salts to effect the deposition of a film of the dry wetting agent on the surface of the particle, premature reaction between the reactive salts is retarded and a faster and more complete reaction is effected when the mixture of the reacting salts is dissolved in water.

In treating the reactive salts prior to mixing, we have found that from ¼% to 3% of the wetting agent based on the weight of the individual salts is sufficient to afford the desired protective coating in the case of most reactive salt mixtures and effectually retards the rate of reaction between these salts when they are mixed and stored dry, and, additionally, increases the reaction rate or rate of neutralization of the components of the mixture when put in water. It is to be understood that larger percentages may be used when desired although in general this will be found unnecessary.

When sodium perborate is used as one of the reactive salts I have found that the addition of an inert, inorganic basic material to the mixture results in an improved product over and above that which is obtained by means of a wetting-out agent alone. Basic magnesium compounds are preferred, such as normal or basic magnesium carbonate, tri-magnesium phosphate, or tri-calcium and the like. It is to be understood that the invention is not limited to a mixture of inter-reactive salts containing a stabilizing base. Similarly, it is not limited to any specific wetting-out agent. In general, any of the wetting-out agents on the market may be used for my purpose although some discretion must be exercised where special properties are desired. Thus where the inter-reactive mixture is used as an oral medicament, or in food stuffs, wetting-out agents which inherently possess or impart bitter tastes should be avoided. I have found that for such special uses the sodium salt of lauryl sulfate gives satisfactory results.

As one example of the application of my invention I give the following preparation designed to be used as a mild oxidizing mouth wash or dentifrice: 27 parts of monocalcium phosphate were treated by spraying onto it a 10% solution of sodium lauryl sulphate in 66% ethyl alcohol, the remaining 34% being water, as to yield the equivalent of 1% of sodium lauryl sulphate based on the weight of the monocalcium phosphate; 46 parts of sodium perborate were likewise treated with an alcoholic water solution of sodium lauryl sulphate and the two salts were thereupon dried separately at 60° C. for evaporation of the solvent. After drying, the salts were each intimately mixed with 13½ parts of basic magnesium carbonate and subsequently the two mixtures combined to form a single mixture consisting of 27 parts monocalcium phosphate, 46 parts sodium perborate, 27 parts basic magnesium carbonate and 0.73 part sodium lauryl sulphate. This mixture was stored in an open container and subjected to normal summer conditions prevailing in the middle western portion of the U. S. A. After ninety days a chemical analysis showed that a sample of commercial flavored sodium perborate stored under the same conditions contained only 62.6% of the original available oxygen, whereas the mixture outlined above contained 97% of the original oxygen.

Likewise, it was found that when the dry mixture is prepared and immediately dissolved in water containing phenol-phthalein as an indicator, the alkalinity was discharged in less than two seconds; after ten days' storage of the dry mixture the alkalinity was discharged in two seconds; after thirty days' storage the alkalinity still discharged in two seconds and after ninety days it was discharged in seven seconds. A similar mixture, which, however, contained no wetting agent when first prepared, discharged the alkalinity in the test described in two seconds; after ten days' storage the alkalinity persisted for twenty seconds and after thirty days the alkalinity was not discharged in one-hundred and eighty seconds.

The same general procedure as is described above may be applied to other reactive salt mixtures. It is to be understood that the use of aqueous alcohol as a solvent for the wetting-out agent is optional. It is likewise to be understood that the use of a base for stabilizing oxidizing reactive salt mixtures containing perborate, while peculiarly advantageous in the case of perborate mixtures, is not essential to the present invention. Other salt mixtures which have been treated successfully in this manner include baking powders, effervescent tonic mixtures and similar medicaments. It is to be understood that the product may be used as a powder or may be tabletted by methods well known in this art.

What I claim is:

1. A stable preparation consisting of a dry physical mixture of inter-reactive acid and basic salts, characterized in that the individual particles of the salts are coated with a soluble salt of sulphated aliphatic alcohols.

2. A stable preparation consisting of a dry physical mixture of inter-reactive acid and basic salts, characterized in that the individual particles of the salts are coated with an alkylated aryl sulphonate.

3. A stable preparation consisting of a dry physical mixture of the inter-reactive oxygen liberating salts, monocalcium phosphate and sodium perborate, characterized in that the individual particles of the salts are coated with the sodium salt of mono lauryl sulfate and mixed with basic magnesium carbonate.

4. A dry, stable preparation consisting of a physical mixture of dry salts which are inter-reactive when wet, characterized in that the individual particles of salt are coated with a non-soap-bearing organic wetting agent consisting of a salt of sulfated aliphatic alcohols having wetting out properties.

5. A stable preparation consisting of a dry, physical mixture of inter-reactive oxygen liberating salts characterized in that the individual particles of salt are coated with a non-soap-bearing organic wetting agent, said salts consisting of sodium perborate and monocalcium phosphate and said wetting agent consisting of the sodium salt of lauryl sulfate.

HENRY V. MOSS.